United States Patent [19]

Roberts

[11] 4,442,372
[45] Apr. 10, 1984

[54] PIEZO ELECTRIC APPARATUS FOR GENERATING ELECTRICITY

[75] Inventor: Walter M. Roberts, Buffalo, N.Y.

[73] Assignee: Walton Energy Systems Co., Buffalo, N.Y.

[21] Appl. No.: 443,229

[22] Filed: Nov. 22, 1982

[51] Int. Cl.³ .................................................. H01L 41/08
[52] U.S. Cl. ................................... 310/339; 310/328; 310/321; 310/800; 310/338
[58] Field of Search ............... 310/311, 321, 328, 338, 310/339, 800; 290/1 R, 2; 322/2

[56] References Cited

U.S. PATENT DOCUMENTS

| | | | |
|---|---|---|---|
| 2,522,389 | 9/1950 | Mason | 310/339 X |
| 3,122,015 | 2/1964 | Shapiro et al. | 310/328 X |
| 3,239,678 | 3/1966 | Kolm et al. | 310/339 X |
| 3,665,226 | 5/1972 | Sinker et al. | 310/339 X |
| 3,822,388 | 7/1974 | Martini et al. | 322/2 X |
| 4,387,318 | 6/1983 | Kolm et al. | 310/339 |

FOREIGN PATENT DOCUMENTS 613421  6/1978  U.S.S.R. .................. 310/339

Primary Examiner—Mark O. Budd
Attorney, Agent, or Firm—Bruns & Jenney

[57] ABSTRACT

A variable pressure piezo electric generator comprised of a furnace chamber, a refrigerant chamber surrounding the furnace chamber in heat exchange relation thereto and a condensing chamber in communication with the refrigerant chamber. The refrigerant chamber contains a liquid refrigerant that is vaporized by the furnace heat and flows into and through the condensing chamber where it condenses. Piezo electric elements are mounted in the condensing chamber in the path of the pressurized refrigerant. An apertured plate is mounted in the condensing chamber between adjacent pairs of the piezo electric elements. The apertures in the respective plates vary in size which causes refrigerant pressure variations. As a result, the refrigerant exerts mechanical forces on the piezo electric elements causing them to produce electricity.

6 Claims, 1 Drawing Figure

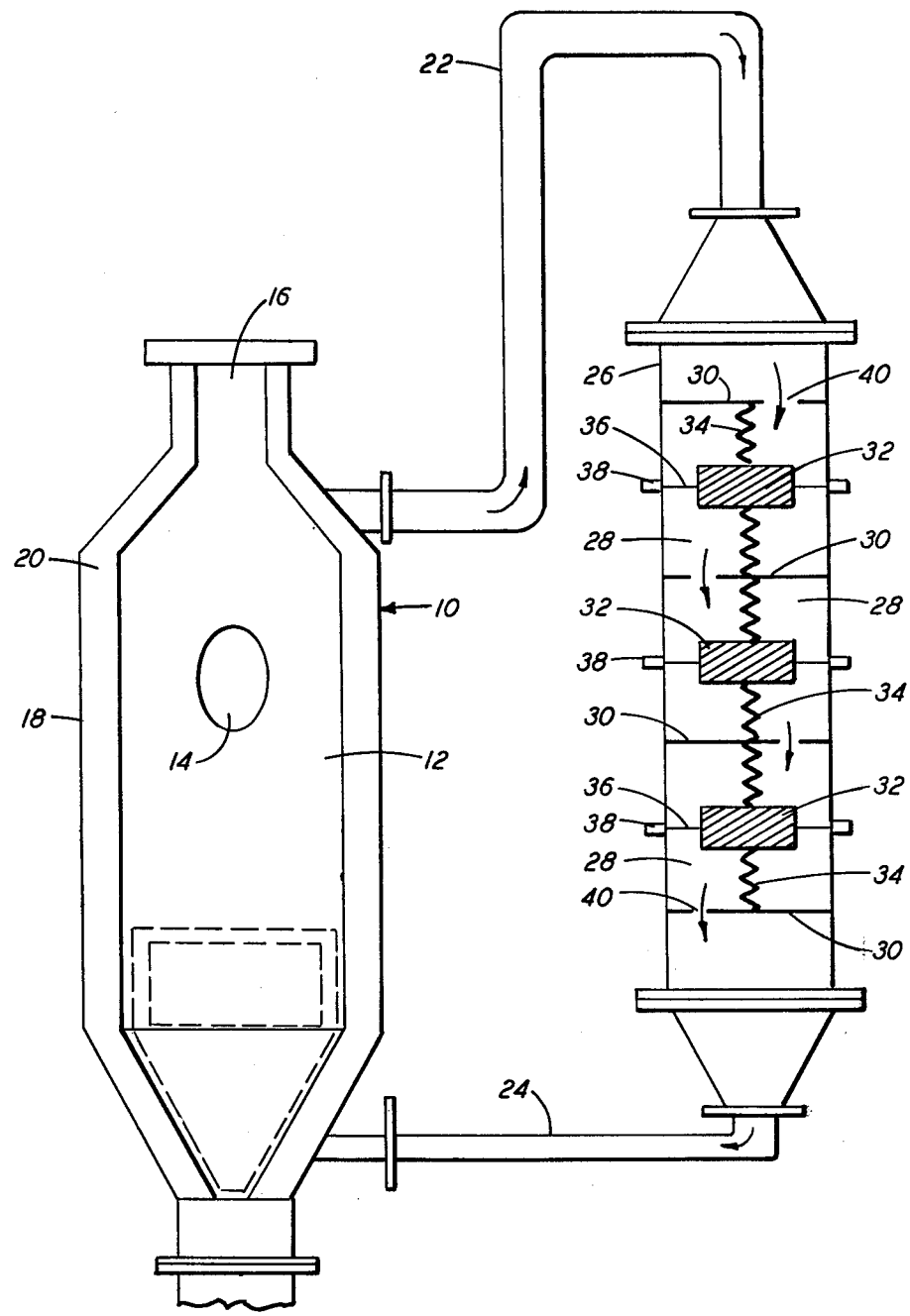

4,442,372

PIEZO ELECTRIC APPARATUS FOR GENERATING ELECTRICITY

BACKGROUND OF THE INVENTION

This invention relates broadly to generators, and has particular reference to a novel generator and method for producing electricity from piezo electric material by means of a vaporized refrigerant that acts on the piezo electric material, the pressure of the refrigerant being varied to cause it to exert mechanical forces on the piezo electric material.

Apparatus has been developed heretofore for generating electricity by means of a gas under pressure. Thus, U.S. Pat. No. 3,080,515 to E. C. Kehoe discloses methods and apparatus for developing electrical energy by means of a gas driven arc. U.S. Pat. No. 3,405,334 to H. H. Jewett et al discloses an electrostatic generator wherein the plates of a variable capacitor are enclosed in a vacuum chamber and their separation is varied by pneumatic means to produce a current. U.S. Pat. No. 4,288,735 to R. C. Crites discloses a vibrating electret reed voltage generator wherein the reed vibration is induced by fluid pressure supplied to the reed chamber and controlled through a fluid oscillating circuit. None of these patents discloses a generator that utilizes piezo electric material in combination with a vaporized refrigerant under varying pressure as in the present invention.

Other but less pertinent patents noted in the course of a preliminary search are U.S. Pat. Nos. 3,593,110 and 4,220,906 and Russian Pat. No. 656,167 (1979).

The closest prior art known to the applicants is U.S. Pat. No. 3,665,226 granted May 23, 1972 to R. A. Sinker et al. The Sinker patent is directed to an electric generator operated by means of the flow of a fluid against a diaphragm to which a piezo electric material is secured. The fluid flows into a cavity and exhausts from the cavity between the diaphragm and a closely spaced annular shoulder. Pressure variations within the cavity caused by flexure of the diaphragm create a self-sustained diaphragm vibration for generation of electricity by the piezo electric material.

SUMMARY OF THE INVENTION

The electricity generator of the present invention is essentially comprised of a furnace chamber for producing heat, a refrigerant chamber surrounding the furance chamber in heat exchange relation thereto and a condensing chamber in communication with the refrigerant chamber. The refrigerant chamber contains a liquid refrigerant that is vaporized by the furnace heat and flows into and through the condensing chamber where it condenses. The liquid refrigerant is then returned to the refrigerant chamber.

A plurality of piezo electric elements are mounted in the condensing chamber in the path of the pressurized refrigerant. These elements are spaced one above the other and an apertured plate is mounted in the condensing chamber between each adjacent pair of the elements. The apertures in the respective plates vary in size which causes refrigerant pressure variations. As a result, the refrigerant exerts mechanical forces on the piezo electric elements causing them to produce electricity.

The generator of the invention differs from that of the Sinker patent in its use of a heat source to vaporize a refrigerant, and in its arrangement of the piezo electric elements in the condensing chamber and means for varying the pressure of the refrigerant passing through said chamber.

BRIEF DESCRIPTION OF THE DRAWINGS

The single drawing FIGURE is a schematic diagram of a variable pressure piezo electric generator embodying the invention.

DESCRIPTION OF THE PREFERRED EMBODIMENT

Referring now to the drawing, the reference number 10 indicates a furnace having a combustion chamber 12, fuel inlet 14 and flue gas outlet 16. In the generator of the invention, it is contemplated that coal will be burned but any other suitable fuel can be used. Spaced from the furnace wall and surrounding it is a second wall or jacket 18 that together with the furnace wall defines a fluid tight refrigerant chamber 20. The chamber 20 contains a liquid refrigerant such as Freon.

The refrigerant chamber 20 is connected by an outlet conduit 22 and an inlet or return conduit 24 to a fluid tight condensing chamber 26. In the illustrated embodiment of the invention the chamber 26 is tubular and is divided into a series of compartments 28 by a plurality of apertured plates 30. A piezo electric element 32 is resiliently mounted as by springs 34 in each compartment. The piezo electric elements can be solid discs as shown or can have any other suitable shape or form.

Each piezo electric element 32 is connected by a pair of leads 36 to a pair of externally mounted frequency transducers 38. These transducers are known, commercially available items such as those marketed by Pennwalt Chemical Co. of Philadelphia, Pa. and others.

Each of the condenser chamber plates 30 has an aperture 40 to permit the refrigerant to flow through the chamber as will be described in more detail hereinafter. As indicated in the drawing, the plate apertures 40 successively decrease in size from the inlet to the outlet end of the condensing chamber, the apertures serving as limiting orifices to the gas flow.

In operation, the liquid refrigerant in chamber 20 is heated by the furnace 10 and vaporizes. The vaporized refrigerant flows through the conduit 22 to the condensing chamber 26, flows through the condensing chamber and returns as a liquid to the refrigerant chamber through the conduit 24. The vaporized refrigerant entering the condensing chamber is at a pressure of approximately 300 psi gauge and a frequency of approximately 25,000 cycles per second. Upon leaving the condensing chamber, the refrigerant has condensed and its pressure has dropped to approximately 9 psi gauge.

As the vaporized refrigerant flows through the different sized plate apertures 40, its pressure varies and the pressure variations within the condensing chamber 28 cause mechanical forces to be exerted on the piezo electric elements 32 which produce electricity as a result. In an operating embodiment of the invention, fourteen apertured plates 30 are employed with one less piezo electric element, the plates and elements being in a stacked alternating arrangement as indicated in the drawing. As will be understood, the pressure of the vaporized refrigerant decreases from the inlet to the outlet end of the condensing chamber at the same time that pressure variations or oscillations are occurring due to the plate apertures. In the fourteen plate embodiment referred to above, condensation of the refrigerant occurs between the thirteenth and fourteenth plates.

From the foregoing description it will be apparent that the invention provides a novel and very advantageous variable pressure piezo electric generator. As will be understood by those familiar with the art, the invention may be embodied in other specific forms without departing from the spirit or essential characteristics thereof.

We claim:

1. In a frequency generator, a furnace chamber in which heat is produced, a refrigerant chamber at least partially surrounding the furnace chamber, a liquid refrigerant in the refrigerant chamber that is vaporized by the heat produced in the furnace chamber, a condensing chammber, conduit means connecting the refrigerant chamber with the condensing chamber whereby vaporized refrigerant under pressure flows from the refrigerant chamber to the condensing chamber and after passing through the latter returns to the refrigerant chamber, a plurality of piezo electric elements in the condensing chamber in the path of the pressurized refrigerant passing therethrough, and means in the condensing chamber for producing variations in the refrigerant pressure whereby the refrigerant exerts a mechanical force on the piezo electric elements which in turn produce electricity, said last-named means comprising an apertured plate member located between each adjacent pair of piezo electric elements.

2. A frequency generator as defined in claim 1 wherein the plate member apertures are respectively dimensioned so as to produce the refrigerant pressure variations.

3. In a frequency generator, a furnace chamber in which heat is produced, a refrigerant chamber arranged in heat exchange relation to the furnace chamber, a refrigerant in the refrigerant chamber that is vaporized by the heat produced in the furnace chamber, a condensing chamber, means connecting the refrigerant chamber with the condensing chamber whereby vaporized refrigerant under pressure flows from the refrigerant chamber to the condensing chamber and after passing through the latter returns to the refrigerant chamber, a plurality of piezo electric elements mounted in the condensing chamber in spaced relation to one another, the piezo electric elements being located in the chamber so as to be in the path of the pressurized refrigerant passing therethrough, and a plurality of apertured plate members mounted in the condensing chamber in alternate relation to the piezo electric elements, the apertured plate members being operable to produce variations in the refrigerant pressure whereby the refrigerant exerts mechanical forces on the piezo electric elements causing them to produce electricity.

4. A frequency generator as defined in claim 3 wherein each plate member has a single aperture therethrough, the apertures in successive plates varying in size so as to produce the refrigerant pressure variations.

5. In a frequency generator, a furnace chamber in which heat is produced, a refrigerant chamber at least partially surrounding the furnace chamber in a heat exchange relation thereto, a refrigerant in the refrigerant chamber that is vaporized by the heat produced in the furnace chamber, an elongated condensing chamber, means connecting the refrigerant chamber with the condensing chamber whereby vaporized refrigerant under pressure flows from the refrigerant chamber to the condensing chamber and after passing through the latter returns to the refrigerant chamber, a plurality of plate members mounted in the condensing chamber so as to divide it into a plurality of successive compartments, a piezo electric element resiliently mounted in each compartment, each plate member having an aperture therein to permit the pressurized refrigerant to flow through the successive compartments, the plate member apertures being respectively dimensioned so as to create variations in the refrigerant pressure which act on the piezo electric elements causing the latter to produce electricity, and a transducer element operably connected to each piezo electric element for collecting the electricity.

6. A frequency generator as defined in claim 5 wherein the refrigerant is Freon.

* * * * *